(12) United States Patent
Liepold et al.

(10) Patent No.: US 7,857,510 B2
(45) Date of Patent: Dec. 28, 2010

(54) TEMPERATURE SENSING CIRCUIT

(76) Inventors: Carl F Liepold, 1635 W. Azaela Dr., Chandler, AZ (US) 85248; Craig M Aykroyd, 43350 W. Desert Fairways Dr., Maricopa, AZ (US) 85239; Jonathan Daniel McLin, 2101 E. Vaughn St., Tempe, AZ (US) 85283

( * ) Notice: Subject to any disclaimer, the term of this patent is extended or adjusted under 35 U.S.C. 154(b) by 207 days.

(21) Appl. No.: 10/704,368

(22) Filed: Nov. 8, 2003

(65) Prior Publication Data

US 2005/0099752 A1    May 12, 2005

(51) Int. Cl.
*G01K 7/01*     (2006.01)
*G01K 15/00*    (2006.01)

(52) U.S. Cl. .................. 374/178; 374/170; 374/172; 374/1; 702/130; 702/99; 327/512

(58) Field of Classification Search ............... 374/170, 374/178; 327/512–513, 63, 65, 539, 542, 327/285, 287, 288, 335, 543; 323/234, 299, 323/281, 907; 324/76.11, 157
See application file for complete search history.

(56) References Cited

U.S. PATENT DOCUMENTS

| | | | |
|---|---|---|---|
| 3,488,529 A | | 1/1970 | Howe |
| 3,750,155 A | | 7/1973 | Oman |
| 3,825,778 A | * | 7/1974 | Ahmed .................. 307/117 |
| 4,004,462 A | * | 1/1977 | Dobkin .................. 374/173 |
| 4,035,827 A | * | 7/1977 | Wheatley, Jr. ............. 257/577 |
| 4,069,428 A | * | 1/1978 | Reedy .................... 326/16 |
| 4,087,758 A | * | 5/1978 | Hareyama .............. 323/314 |
| 4,114,442 A | | 9/1978 | Pratt |
| 4,122,719 A | | 10/1978 | Carlson et al. |
| 4,123,698 A | * | 10/1978 | Timko et al. ............. 323/316 |
| 4,165,642 A | * | 8/1979 | Lipp .................... 374/170 |
| 4,224,537 A | * | 9/1980 | Glazer .................. 327/512 |
| 4,317,054 A | * | 2/1982 | Caruso et al. ............ 327/539 |
| 4,331,888 A | * | 5/1982 | Yamauchi ............... 340/598 |
| 4,473,797 A | | 9/1984 | Shiota |
| 4,488,824 A | * | 12/1984 | Salem .................. 374/181 |
| 4,622,476 A | * | 11/1986 | Venkatesh .............. 327/513 |
| 4,672,304 A | * | 6/1987 | Degrauwe et al. .......... 323/314 |
| 4,716,520 A | | 12/1987 | Locke et al. |
| 5,079,716 A | | 1/1992 | Lenhardt et al. |
| 5,085,526 A | * | 2/1992 | Sawtell et al. ............ 374/101 |
| 5,197,889 A | | 3/1993 | Rizzo et al. |
| 5,472,804 A | | 12/1995 | Austin et al. |
| 5,481,220 A | * | 1/1996 | Mildren ................ 327/512 |
| 5,519,354 A | * | 5/1996 | Audy .................. 327/512 |
| 5,526,871 A | | 6/1996 | Musser et al. |
| 5,710,515 A | | 1/1998 | Teggatz et al. |
| 5,711,605 A | | 1/1998 | Reher et al. |
| 5,719,378 A | | 2/1998 | Jackson et al. |
| 5,764,541 A | | 6/1998 | Hermann et al. |
| 5,803,357 A | | 9/1998 | Lakin |
| 5,805,403 A | | 9/1998 | Chemla |
| 5,838,578 A | * | 11/1998 | Pippin .................. 716/4 |

(Continued)

*Primary Examiner*—Gail Verbitsky
(74) *Attorney, Agent, or Firm*—Knobbe Martens Olson & Bear LLP

(57) ABSTRACT

A temperature sensor, in accordance with the principles of the invention comprises a silicon substrate. The silicon substrate includes a bandgap, an offset circuit for providing calibration offsets, and a gain block for providing an output that varies substantially linearly with changes in temperature of the substrate.

16 Claims, 6 Drawing Sheets

U.S. PATENT DOCUMENTS

| | | | | |
|---|---|---|---|---|
| 5,867,012 A * | 2/1999 | Tuthill | | 323/313 |
| 5,961,215 A * | 10/1999 | Lee et al. | | 374/178 |
| 5,982,221 A * | 11/1999 | Tuthill | | 327/512 |
| 6,008,685 A | 12/1999 | Kunst | | |
| 6,016,051 A * | 1/2000 | Can | | 323/315 |
| 6,019,508 A * | 2/2000 | Lien | | 374/178 |
| 6,069,761 A | 5/2000 | Stupp | | |
| 6,077,228 A | 6/2000 | Schonberger | | |
| 6,091,255 A | 7/2000 | Godfrey | | |
| 6,121,824 A * | 9/2000 | Opris | | 327/539 |
| 6,137,341 A * | 10/2000 | Friedman et al. | | 327/513 |
| 6,149,299 A * | 11/2000 | Aslan et al. | | 374/178 |
| 6,157,244 A * | 12/2000 | Lee et al. | | 327/539 |
| 6,164,816 A | 12/2000 | Aderhold et al. | | |
| 6,169,442 B1 * | 1/2001 | Meehan et al. | | 327/513 |
| 6,217,213 B1 * | 4/2001 | Curry et al. | | 374/178 |
| 6,255,807 B1 * | 7/2001 | Doorenbos et al. | | 323/314 |
| 6,275,098 B1 * | 8/2001 | Uehara et al. | | 327/539 |
| 6,283,628 B1 | 9/2001 | Goodwin | | |
| 6,332,710 B1 | 12/2001 | Aslan et al. | | |
| 6,362,612 B1 * | 3/2002 | Harris | | 323/312 |
| 6,393,374 B1 | 5/2002 | Rankin et al. | | |
| 6,411,158 B1 * | 6/2002 | Essig | | 327/539 |
| 6,466,081 B1 * | 10/2002 | Eker | | 327/541 |
| 6,480,127 B1 * | 11/2002 | Aslan | | 341/119 |
| 6,494,616 B1 | 12/2002 | Tokhtuev et al. | | |
| 6,509,783 B2 * | 1/2003 | Chowdhury | | 327/513 |
| 6,783,274 B2 * | 8/2004 | Umeyama et al. | | 374/178 |
| 6,833,742 B2 * | 12/2004 | Shimizu et al. | | 327/143 |
| 6,870,418 B1 * | 3/2005 | Tang et al. | | 327/513 |
| 6,975,047 B2 | 12/2005 | Pippin | | |
| 6,996,491 B2 | 2/2006 | Gold et al. | | |
| 7,018,095 B2 | 3/2006 | Grannes et al. | | |
| 7,059,769 B1 | 6/2006 | Potega | | |
| 7,069,955 B2 * | 7/2006 | Glejbol et al. | | 138/135 |
| 7,082,377 B1 | 7/2006 | Aslan et al. | | |
| 7,088,680 B1 | 8/2006 | Freitag et al. | | |
| 7,188,273 B2 | 3/2007 | Allen et al. | | |
| 7,301,389 B2 * | 11/2007 | Coady | | 327/539 |
| 2002/0044005 A1 * | 4/2002 | Chowdhury | | 327/512 |
| 2003/0144783 A1 | 7/2003 | Drummond et al. | | |
| 2004/0095187 A1 * | 5/2004 | Li | | 327/539 |
| 2004/0105488 A1 | 6/2004 | Felder | | |
| 2005/0001605 A1 * | 1/2005 | Marinca | | 323/314 |
| 2005/0099163 A1 | 5/2005 | Liepold | | |
| 2006/0056485 A1 * | 3/2006 | Hartley | | 374/170 |
| 2006/0197584 A1 * | 9/2006 | Hsu | | 327/539 |
| 2006/0222045 A1 | 10/2006 | Byquist et al. | | |
| 2006/0265174 A1 | 11/2006 | Doyle et al. | | |
| 2007/0052473 A1 * | 3/2007 | McLeod | | 327/539 |
| 2007/0080740 A1 * | 4/2007 | Berens et al. | | 327/539 |
| 2007/0109037 A1 * | 5/2007 | Lin | | 327/539 |
| 2007/0126495 A1 * | 6/2007 | Ivanov et al. | | 327/539 |
| 2007/0164849 A1 * | 7/2007 | Haeberle et al. | | 340/7.23 |
| 2007/0170907 A1 * | 7/2007 | Ito et al. | | 323/316 |
| 2007/0182478 A1 * | 8/2007 | Mun et al. | | 327/539 |
| 2009/0058391 A1 * | 3/2009 | Rokos | | 323/313 |
| 2009/0256623 A1 * | 10/2009 | Tajima | | 327/512 |
| 2010/0002747 A1 * | 1/2010 | Bosch et al. | | 374/170 |

* cited by examiner

TEMPERATURE SENSING CIRCUIT

FIELD OF THE INVENTION

This invention pertains to temperature sensing apparatus, in general, and to an easily calibrated temperature sensing and control circuit, in particular.

BACKGROUND OF THE INVENTION

One of the oldest, most commonly utilized temperature sensing devices is the thermistor. These devices are inexpensive; however, the low cost for the temperature sensor comes with several significant drawbacks. Thermistors require the use of a separate external resistor to operate. Thermistors are extremely non-linear with temperature, dropping in resistance as temperature increases. The non-linearity provides large changes at low temperatures, but small changes at high temperatures. This phenomenon requires a very accurate Analog to Digital Converter and other components in utilization circuits and systems that utilize thermistors as temperature sensing devices.

Thermistor accuracies can vary significantly from part to part necessitating a calibration step to ensure accurate temperature measurements. A non-linear, non-calibrated thermistor is typically inexpensive. However, the associated circuitry which typically includes an analog to digital converter, a reference voltage source, non-volatile memory, and software overhead in addition to the microcontroller, add significantly to overall system cost.

It is highly desirable to provide a low power, linear, highly accurate, calibrated temperature sensor that can replace thermistors.

SUMMARY OF THE INVENTION

In accordance with the principles of the invention, a temperature sensor is provided that is highly linear, highly accurate, physically smaller than thermistors, calibrated, and which requires very low operating current.

Still further in accordance with the principles of the invention, a temperature sensor is provided which is integrated onto a silicon die and may be integrated with directly with a utilization circuit.

A temperature sensor, in accordance with the principles of the invention comprises a silicon substrate. The silicon substrate includes a bandgap, an offset circuit for providing calibration offsets, and a gain block for providing an output that varies substantially linearly with changes in temperature of the substrate.

One embodiment of the invention has first and second terminals formed on the substrate and a transistor coupled between the first and second terminals. The transistor has a control input coupled to the gain block.

Still further, the embodiment includes a current source formed on the silicon substrate for providing current to the bandgap and to the gain block.

In accordance with one aspect of the invention the offset circuit comprises one or more resistance values and fusible links for permanently selecting one of the resistance values.

In an embodiment of the invention the offset circuit comprises a calibration circuit that is operable to set the offset circuit to a desired offset.

In a second embodiment of the invention the temperature sensor includes first and second terminals formed on the substrate, with the gain block and the bandgap being coupled to the first and second terminals; and a third terminal is also formed on the substrate. The gain block has an output coupled to the third terminal.

In accordance with another aspect of the invention one or more resistors are formed in the substrate. The one or more resistors each comprise a pinched well configuration. The pinched well configuration comprises a well and a layer formed on said well. The well comprises a first polarity material formed in said substrate, and the layer comprises a second polarity material formed on the well.

Still further in accordance with an aspect of the invention the layer is in electrical cascade connection with the well to provide a higher resistance value.

BRIEF DESCRIPTION OF THE DRAWING

The invention will be better understood from a reading of the following detailed description of preferred embodiments of the invention in conjunction with the drawing figures in which the sizes of and distances between various elements is not representative of actual physical sizes or distances between various elements and in which like designators are used to identify like or similar elements, and in which.

DETAILED DESCRIPTION

Figure 1:
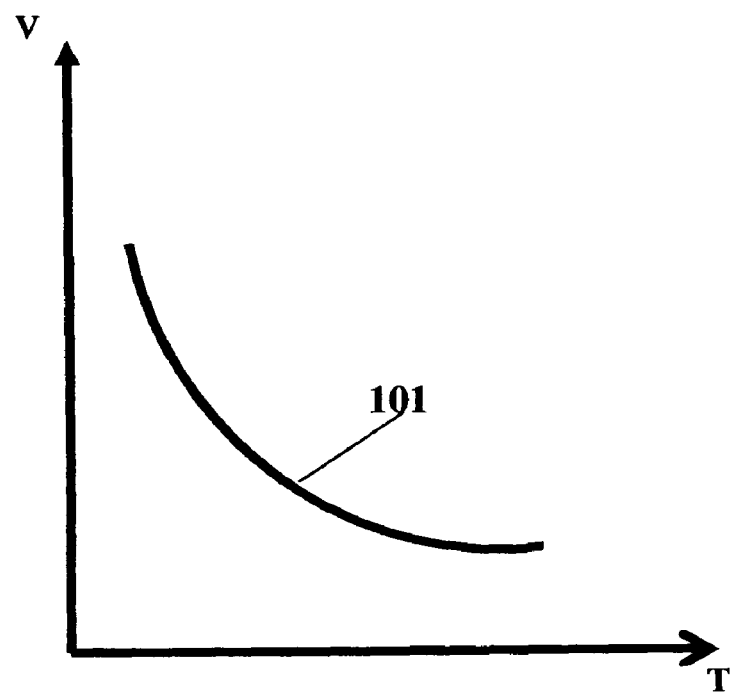
FIG. 1 is a characteristic curve of a thermistor.

FIG. 1 illustrates a typical characteristic temperature curve 101 of a thermistor device. Curve 101 demonstrates the non-linear voltage/temperature characteristic curve of a thermistor.

Figure 2:
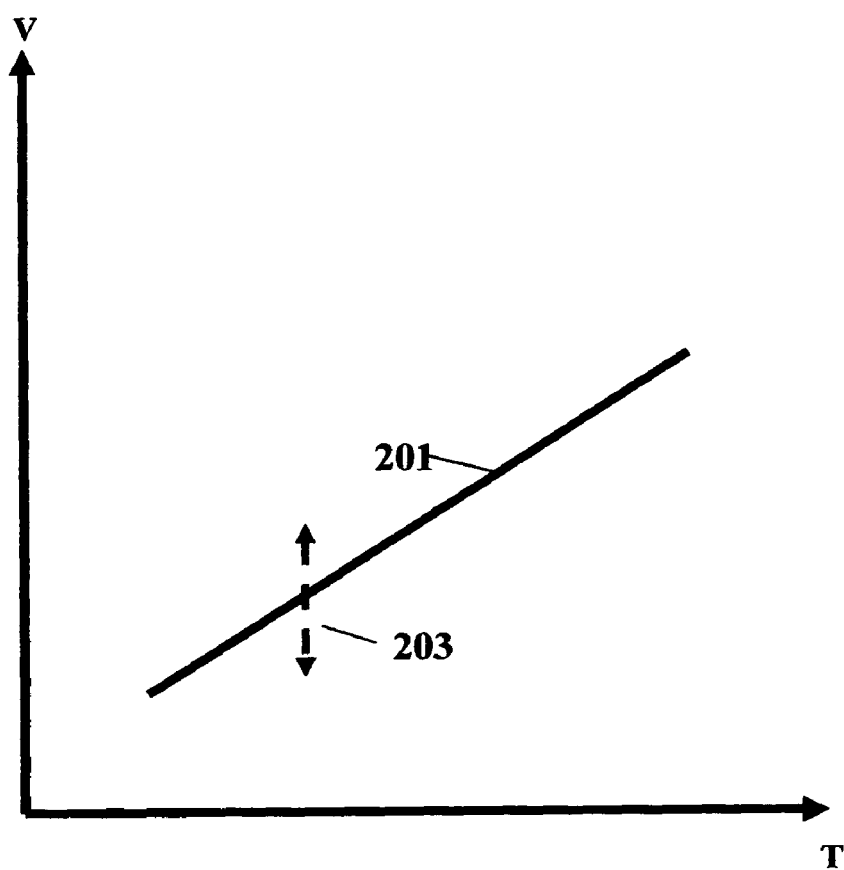
FIG. 2 is a characteristic curve of a sensor in accordance with the principles of the invention.

FIG. 2 illustrates the characteristic temperature curve 201 of a temperature sensor in accordance with the principles of the invention. Advantageously, the characteristic curve is highly linear, thereby simplifying the associated circuitry that utilizes the temperature.

Figure 3:
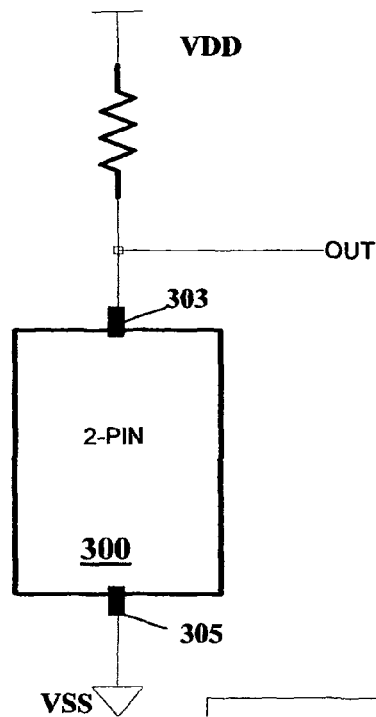
FIG. 3 illustrates a two terminal temperature sensing circuit in accordance with the principles of the invention.
Figure 4:
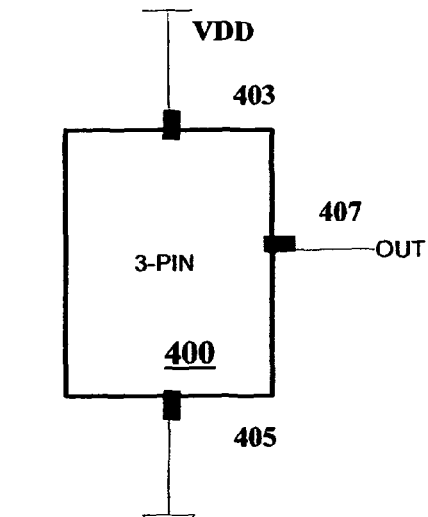
FIG. 4 illustrates a three terminal temperature sensing circuit in accordance with the principles of the invention.

The temperature sensor of the present invention is intended to competitively replace thermistor sensors that are currently in use in the market. To that end, the present invention is a temperature sensing circuit that is configured as either a two terminal 300 as represented in FIG. 3 or as a three terminal device 400 as represented in FIG. 4. The temperature sensor 300, 400 of the present invention also has the distinct advantage over thermistor sensors in that the characteristic curve of the temperature sensor of the invention is highly linear and highly accurate as illustrated by curve 201 in FIG. 2. In addition, temperature sensors 300, 400 of the present invention are significantly smaller than thermistors and additionally require very low operating current.

Figure 5:
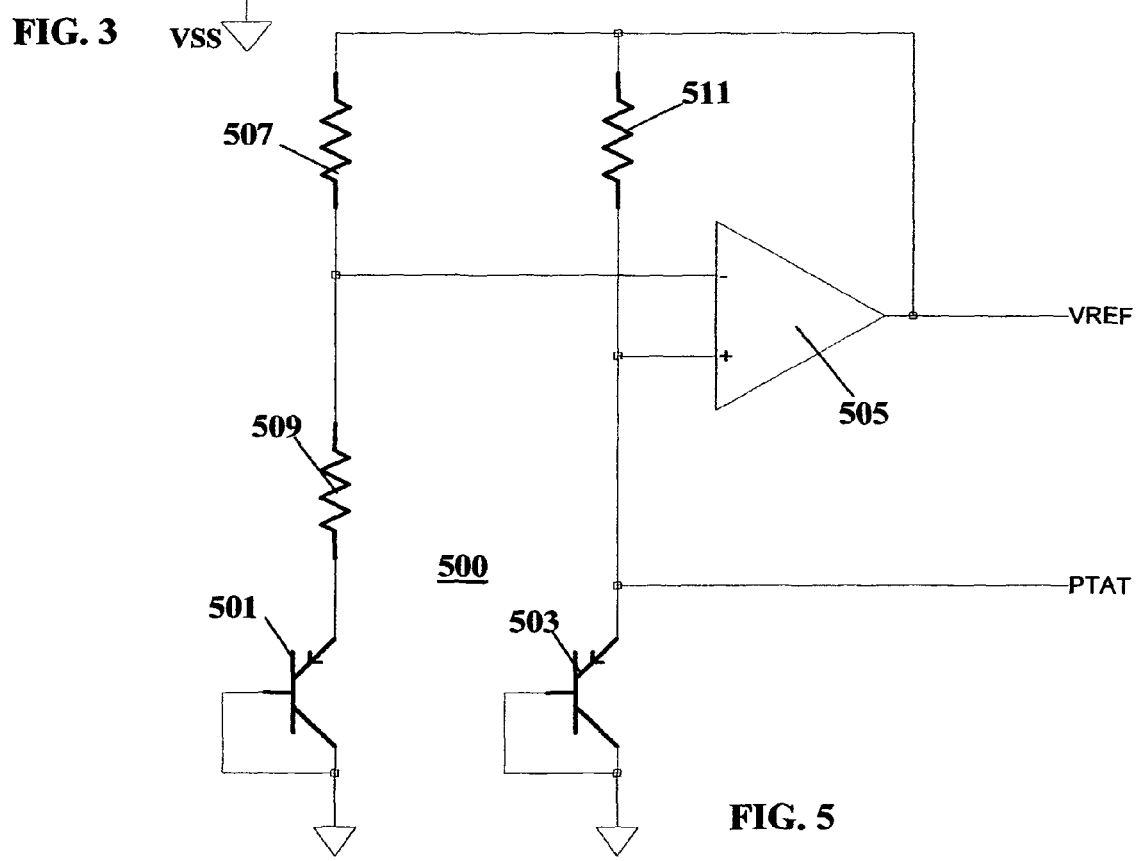
FIG. 5 is a diagram of a bandgap circuit of a type advantageously utilized in the system of FIGS. 3 and 4.

Each of the temperature sensors 300, 400 utilize a bandgap circuit 500. A bandgap circuit of a type that is advantageously utilized in sensors 300, 400 is shown in FIG. 5. Bandgap circuit 500 includes transistors 501, 503. Transistors 501, 503 are connected in a diode configuration wherein the base of each transistor is connected to its collector, thereby forming PN junctions that are used for measuring temperature. The junctions can have equal areas or have unequal areas.

Amplifier 505 provides a reference voltage Vref that is coupled to diode connected transistor 501 through serially resistors 507, 509. Vref is also coupled to diode transistor 503 through resistor 511. Resistors 507 and 511 can be matched or have different values. Resistor 509 provides an offset between the voltages applied to the inputs of amplifier 501 and this offset remains relatively constant. The emitter of either transistor 501 or 503 can be used as the output terminal for the circuit. In bandgap circuit 500, output PTAT is coupled to the emitter of transistor 503. Changes in temperature of the PN junctions of transistors 501, 503 produce changes in the in the voltage drops across transistors 501, 503.

Bandgap circuit 500 generates two voltages Vref and PTAT. These voltages are linear to within 10 mvolts over a 150° C. temperature range in the illustrative embodiments of the invention. PTAT is a reference that is inversely proportional to temperature.

Figure 6:
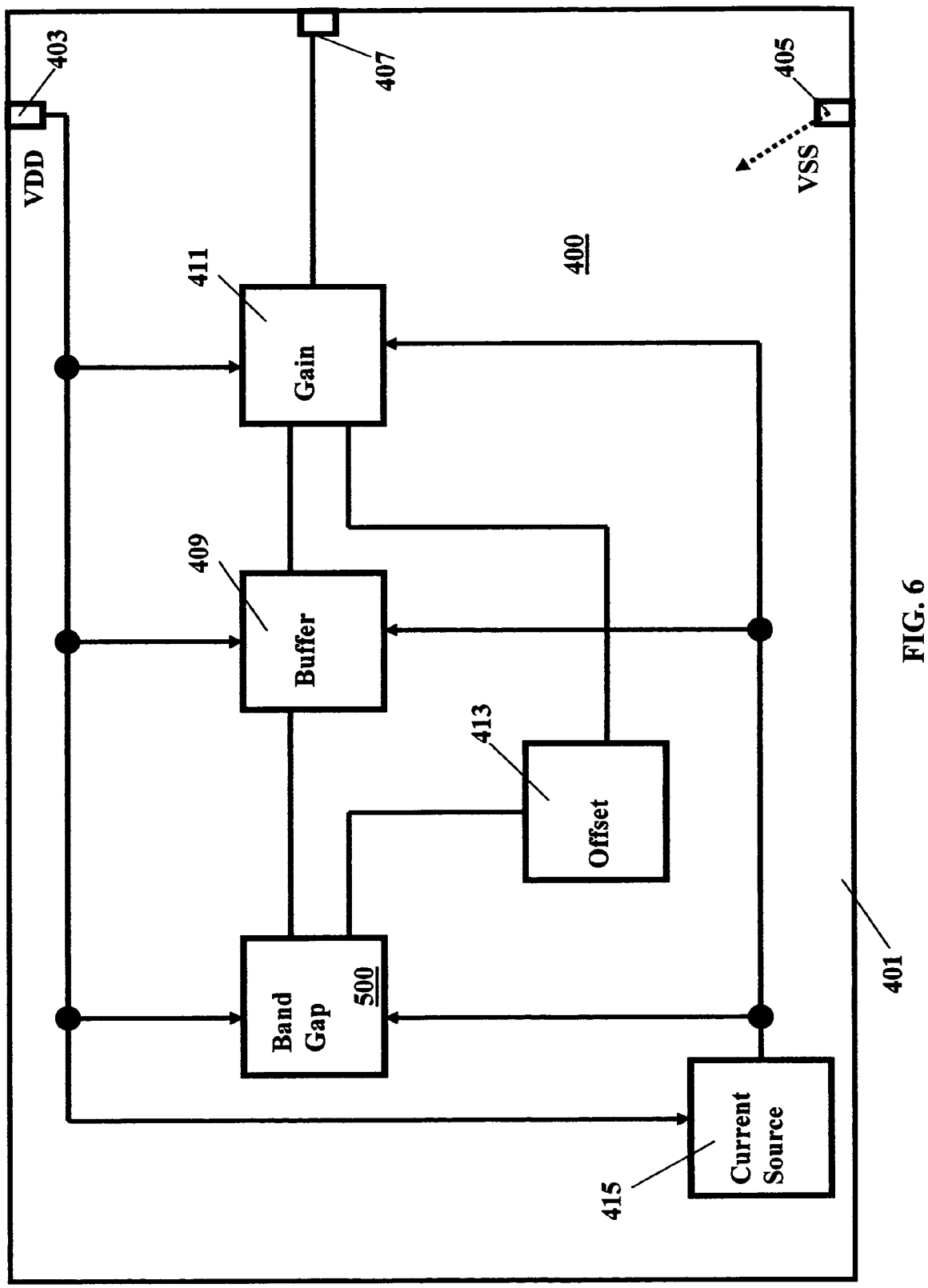
FIG. 6 is a block diagram of the device of FIG. 4.
Figure 7:
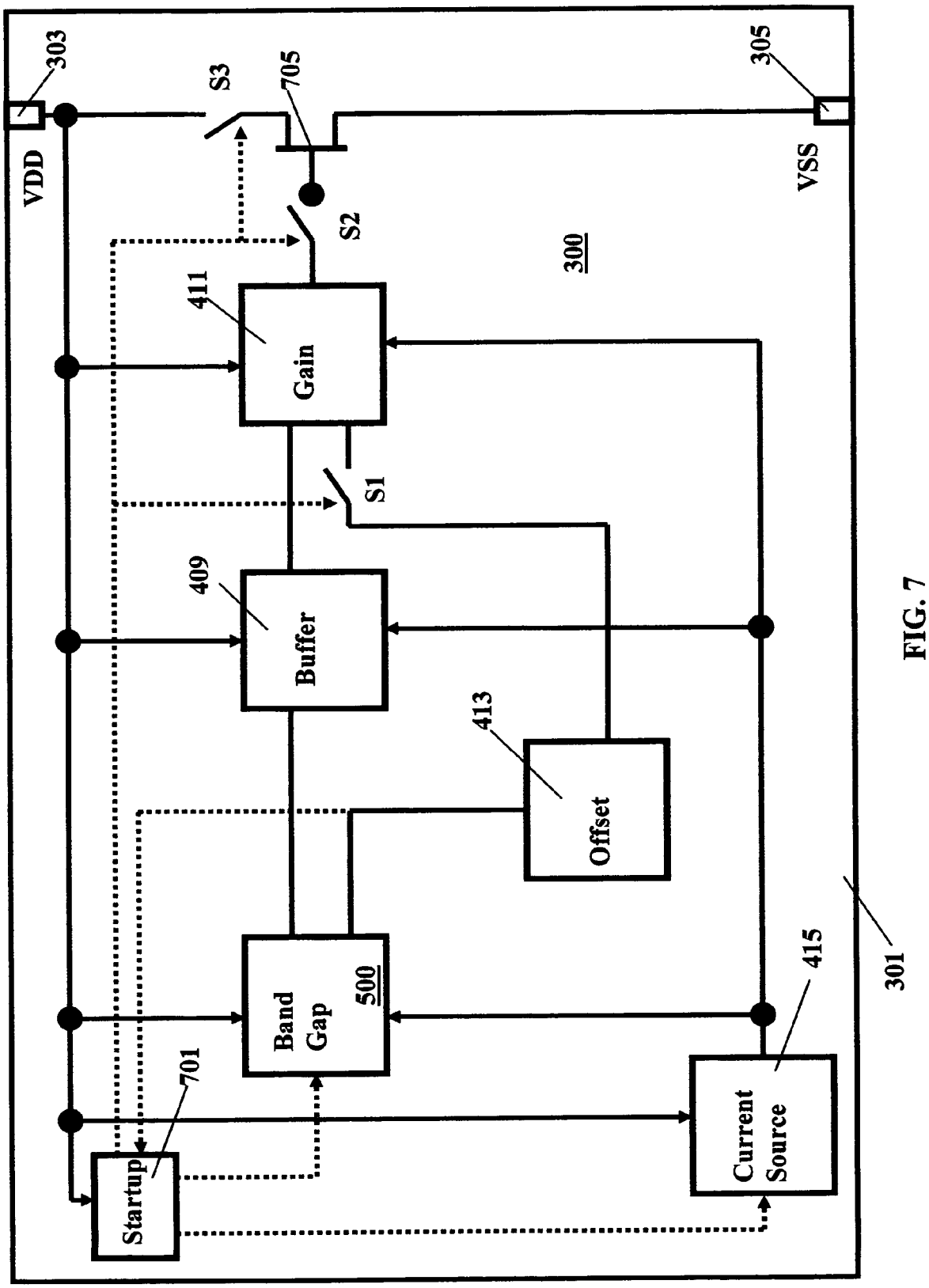
FIG. 7 is a block diagram of the device of FIG. 3.

FIGS. 6 and 7 illustrate the temperature sensors 400, 300, respectively in block diagram form. Each temperature sensor 400, 300 of the present invention is fabricated as a single silicon die 401, 301, respectively. Each temperature sensor 400, 300 comprises a bandgap circuit 500, an offset block 413, a buffer circuit 409 and a gain block 411. In addition, each that has four major functional blocks integrated into the die 101. The four major functional blocks are a bandgap reference 103, an offset block 105, a gain block 107 and an amplification block 109. Still further, each temperature sensor 400, 300 includes a current source 415.

The three terminal sensor circuit of FIG. 6 has one terminal, terminal 403, coupleable to one voltage polarity, a second terminal, terminal 405 coupleable to a second voltage polarity and a third terminal, terminal 407 that provides the temperature determined output signal to a utilization circuit which is not shown in the drawing figures. As the temperature of substrate 401 changes, the output signal at terminal 407 varies.

Turning now to FIG. 7, temperature sensor 300 further includes a start up circuit 701 and controlled switches S1, S2, S3. Start up circuit 701 determines when the supply voltage supplied to sensor 300 has reached a predetermined potential and that the current source 415 and bandgap 500 are also in an operational state. Start up circuit 701 assures that at power on or subsequent to a power interruption or disruption that sensor 300 operates appropriately. FET 705 is coupled to the output of gain block 411 and between terminals 303, 305.

The PTAT output of bandgap 500 is coupled to buffer 409. Buffer 409 provides a high impedance load for bandgap circuit 500. The output of buffer 409 is proportional to, and preferably equal to, the PTAT output signal from bandgap.

The gain block 411 has one input coupled to the output of buffer 409 and a second input coupled to the offset circuit 413.

Figure 8:
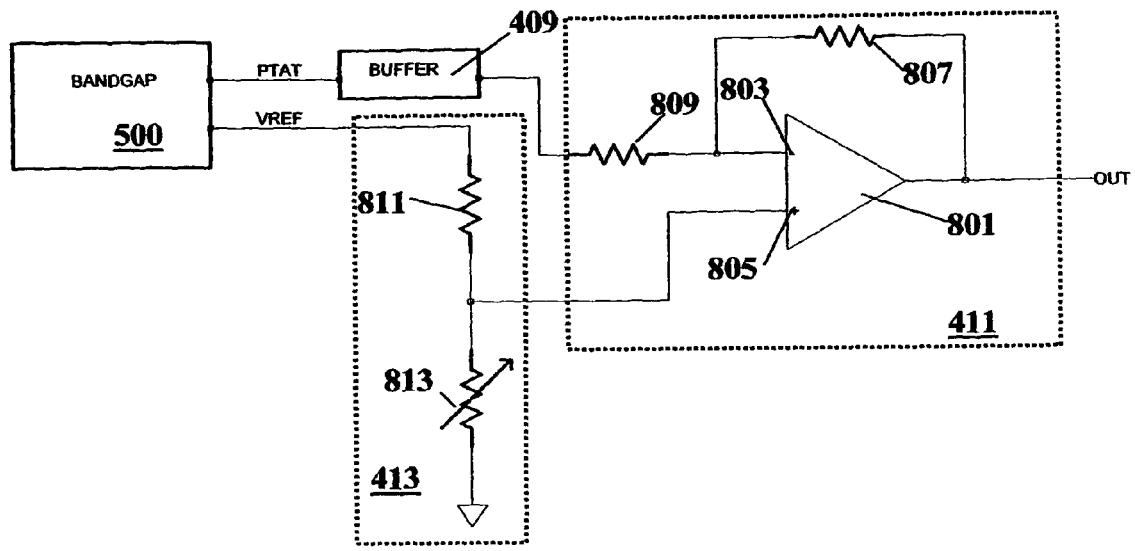
FIG. 8 is a diagram of a temperature system in accordance with the principles of the invention.

FIG. 8 illustrates details of gain block 411 and offset circuit 413 in greater detail. Gain block 411 comprises an operational amplifier 801 having differential inputs 803, 805. Operational amplifier 801 has one input coupled through resistor 809 to the output of voltage buffer 409 and a second input 805 coupled to offset circuit 413. A resistor 807 is connected in a feedback arrangement with amplifier 801. Resistor 801 is selected to determine the gain of gain block 411.

Offset circuit 413 is the functional equivalent of two series connected resistors 811, 813. Resistors 811, 813 are serially coupled to the Vref output. Although resistor 813 is shown schematically as a variable resistor, the resistance value of resistor 813 is, in the illustrative embodiment, selectable during manufacture of the temperature sensor 300, 400. The value of resistor 813 is selected during calibration of the temperature sensor. The value of resistor 813 determines the offset voltage to amplifier 801 of gain block 411.

Offset, indicated by double ended arrow 203 in FIG. 2, effects vertical translation without rotation of characteristic curve 201.

Figure 9:
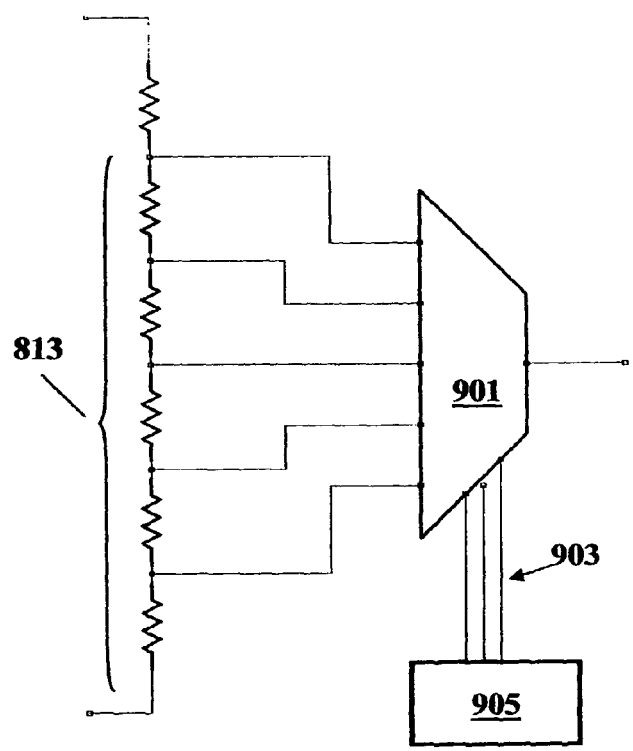
FIG. 9 is a diagram of a resistance calibration portion of the system in accordance with the principles of the invention.

The offset resistance value varies from part to part due to wafer processing. In accordance with one aspect of the present invention, wafer level calibration is performed on temperature sensors 300, 400. Resistor structure 813 is shown in detail in FIG. 9. Resistor 813 comprises a plurality of resistances coupled to a multiplexer 901. Multiplexer 901 has selection inputs 903 that are coupled to fusible links 905. Fusible links 905 are selectively "blown" to set the value of resistor 813.

Figure 10:
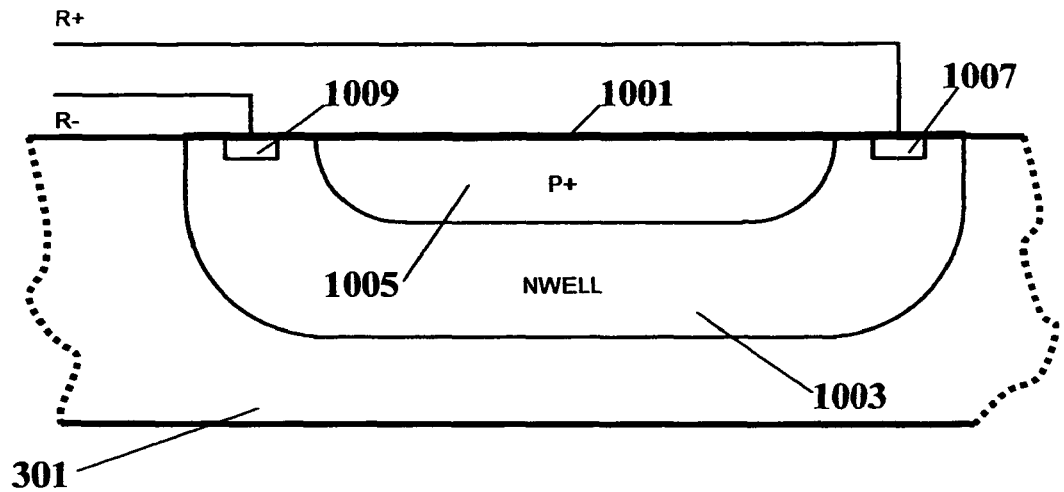
FIG. 10 illustrates a prior art integrated resistor structure.
Figure 11:
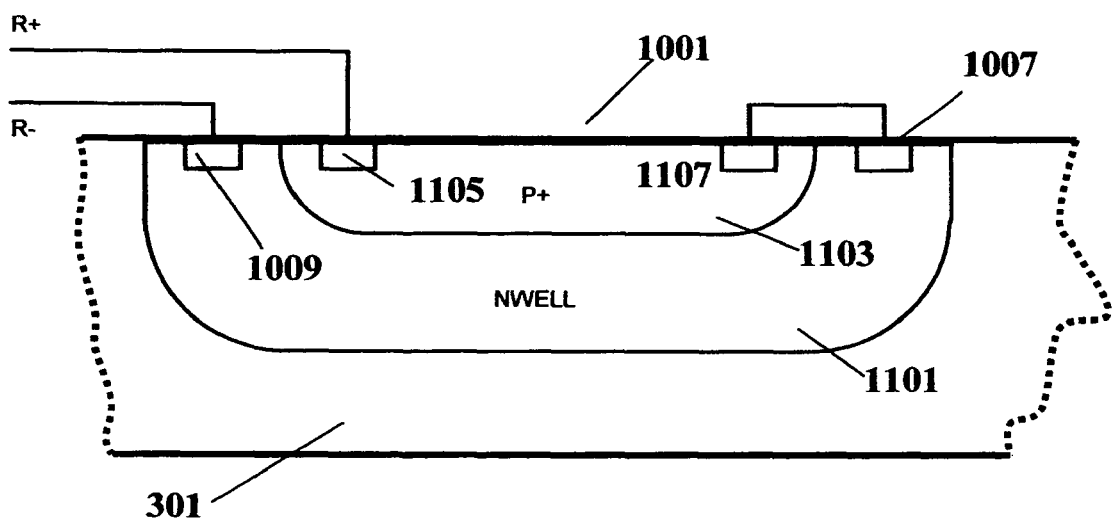
FIG. 11 illustrates an improved integrated resistor structure.

To reduce the size and current of the integrated circuit of the temperature sensor 300, 400 special resistor configurations are used in the illustrative embodiment of the invention. The resistor configurations are shown in FIGS. 10 and 11. Both resistor configurations are formed at surface 101 of the substrate in which the temperature sensor 300, 400 is formed. In FIGS. 10 and 11 the substrate is identified as substrate 301 corresponding to sensor 300. It will be appreciated by those skilled in the art that the same resistor structures can be formed in substrate 401 of sensor 400 as well.

A well 1101 of a first polarity is formed in surface 1001 of the substrate 301. A layer 1103 of opposite conductivity is formed in well 1101. The layer 1103 reduces the thickness of well 1101, thereby increasing the resistance of well 1101. In the resistor structure of FIG. 10, contacts 1007 and 1009 are formed on well 1101 and a resistance is formed there between.

In the resistance structure of FIG. 11, two additional contacts 1105, 1107 are formed only on the layer 1103. Electrical connections are formed so that layer 1103 is serially connected to the resistance formed by well 1103. A resistor is thereby formed to further increase the resistance obtained. The resistor structure of FIG. 11 is utilized in current source 415. By utilizing this structure the size the substrate die 301, 401 is reduced and the total chip current is also reduced.

The invention has been described in terms of various embodiments. It is not intended that the invention be limited to the illustrative embodiments. It will be apparent to those skilled in the art that various modifications and changes may be made to the embodiments without departing from the spirit or scope of the invention. Accordingly, it is intended that the invention be limited only by the claims appended hereto.

What is claimed is:

1. A temperature sensor, comprising:
   a bandgap circuit comprising a first transistor and a second transistor, wherein the first transistor includes a terminal configured to have a voltage indicative of a temperature of a substrate;
   a gain circuit comprising first and second input terminals and configured to provide an output that varies substantially linearly with changes in the temperature of the substrate, wherein the first input terminal is coupled to the terminal of the first transistor such that a voltage of the first input terminal is proportional to the voltage of the terminal of the first transistor; and an offset circuit coupled to the second input terminal of the gain circuit, to the terminal of the first transistor, and to a terminal of the second transistor, wherein the offset circuit is configured to output an offset voltage to the second input terminal of the gain circuit, and wherein the offset voltage is proportional to a difference between the voltage of the terminal of the first transistor and a voltage of the terminal of the second transistor.

2. The temperature sensor of claim 1, wherein the bandgap circuit further comprises a first amplifier, and wherein the gain circuit further comprises a second amplifier.

3. The temperature sensor of claim 2, wherein the first amplifier comprises an output terminal, and wherein the output terminal is coupled to the second amplifier.

4. The temperature sensor of claim 3, wherein the first amplifier further comprises a first input terminal and a second input terminal, wherein the first transistor is coupled to the first input terminal of the first amplifier, and wherein the second transistor is coupled to the second input terminal of the first amplifier.

5. The temperature sensor of claim 4, wherein a voltage at the output terminal is proportional to a voltage differential between the first input terminal of the first amplifier and the second input terminal of the first amplifier.

6. The temperature sensor of claim 5, wherein the output terminal is coupled to the offset circuit such that a voltage at an input terminal of the offset circuit is substantially equal to the voltage at the output terminal.

7. The temperature sensor of claim 1, wherein the offset circuit comprises a voltage divider.

8. A temperature sensor, comprising:
a bandgap circuit comprising a first transistor and a second transistor;
a gain circuit comprising first and second input terminals and configured to provide an output that varies substantially linearly with changes in the temperature of a substrate, wherein the first input terminal of the gain circuit is coupled to the first transistor; and
an offset circuit coupled to the second input terminal of the gain circuit, to the first transistor, and to the second transistor such that the offset circuit provides a offset voltage to the second input terminal of the gain circuit that is proportional to a voltage differential between the first transistor and the second transistor.

9. The temperature sensor of claim 8, wherein the bandgap circuit further comprises a first amplifier, and wherein the gain circuit further comprises a second amplifier.

10. The temperature sensor of claim 9, wherein the first amplifier is coupled to the first and second transistors and comprises a first amplifier output terminal that is coupled to the offset circuit.

11. The temperature sensor of claim 10, wherein a voltage of a first transistor terminal of the first transistor is configured to be indicative of a temperature of a substrate of the bandgap circuit, and wherein the first input terminal of the gain circuit is coupled to the first transistor terminal such that a voltage of the first input terminal is configured to be indicative of the temperature of the substrate.

12. The temperature sensor of claim 11, wherein the second amplifier comprises first and second input terminals and a second amplifier output terminal, wherein the first and second input terminals of the second amplifier are differential inputs and a voltage of the second amplifier output terminal is configured to be indicative of the difference between a voltage of the first input terminal of the second amplifier and a voltage of the second input terminal of the second amplifier.

13. A temperature sensor, comprising:
a bandgap circuit comprising a first transistor and a second transistor, wherein the first transistor includes an output configured to be indicative of a temperature of a substrate at a first terminal;
an offset circuit connected to the first terminal of the first transistor and to a terminal of the second transistor via a first resistive path, wherein the offset circuit is configured to output an offset voltage proportional to a difference between a voltage of the first transistor and a voltage of the second transistor; and
a gain circuit comprising first and second input terminals, wherein the first input terminal of the gain circuit is connected to the terminal of the first transistor via a second resistive path and the second input terminal of the gain circuit is connected to the offset circuit via a third resistive path.

14. The temperature sensor of claim 13, wherein the second resistive path comprises a buffer, wherein the emitter of the first transistor is connected to the buffer, and wherein the first input terminal of the gain circuit is connected to the buffer.

15. The temperature sensor of claim 13, wherein the offset circuit is further connected to the emitter of the first transistor and to an emitter of the second transistor via the first resistive path.

16. A temperature sensor, comprising:
a bandgap circuit comprising a first transistor and a second transistor, wherein the first transistor includes a terminal configured to have a voltage indicative of a temperature of a substrate;
a gain circuit comprising first and second input terminals and configured to provide an output that varies substantially linearly with changes in the temperature of the substrate, wherein the first input terminal is connected to the terminal of the first transistor; and
an offset circuit connected to the second input terminal of the gain circuit, to the terminal of the first transistor, and to a terminal of the second transistor, wherein the offset circuit is configured to output an offset voltage to the second input terminal of the gain circuit, and wherein the offset voltage is proportional to a difference between the voltage of the terminal of the first transistor and a voltage of the terminal of the second transistor.

* * * * *